United States Patent
Rigorth et al.

(10) Patent No.: US 12,414,207 B2
(45) Date of Patent: Sep. 9, 2025

(54) OPERATING A DOMESTIC MICROWAVE APPLIANCE

(71) Applicant: BSH Hausgeräte GmbH, Munich (DE)

(72) Inventors: Kerstin Rigorth, Mühldorf (DE); Sebastian Sterz, Großaitingen (DE); Matthias Vogt, Obersulm (DE)

(73) Assignee: BSH Hausgeräte GmbH, Munich (DE)

( * ) Notice: Subject to any disclaimer, the term of this patent is extended or adjusted under 35 U.S.C. 154(b) by 1339 days.

(21) Appl. No.: 16/640,368

(22) PCT Filed: Jul. 19, 2018

(86) PCT No.: PCT/EP2018/069587
§ 371 (c)(1),
(2) Date: Feb. 20, 2020

(87) PCT Pub. No.: WO2019/037963
PCT Pub. Date: Feb. 28, 2019

(65) Prior Publication Data
US 2020/0178360 A1 Jun. 4, 2020

(30) Foreign Application Priority Data
Aug. 23, 2017 (DE) ............ 10 2017 214 751.2

(51) Int. Cl.
*H05B 6/70* (2006.01)
*F24C 7/02* (2006.01)
(Continued)

(52) U.S. Cl.
CPC ........... *H05B 6/705* (2013.01); *F24C 7/02* (2013.01); *H05B 6/6447* (2013.01); *H05B 6/687* (2013.01); *H05B 6/72* (2013.01)

(58) Field of Classification Search
CPC ......... H05B 6/00; H05B 6/64; H05B 6/6447; H05B 6/645; H05B 6/6452; H05B 6/6455;
(Continued)

(56) References Cited

U.S. PATENT DOCUMENTS 5,841,288 A * 11/1998 Meaney ............... H05B 6/6438
219/703
6,166,362 A * 12/2000 Shon .................... H05B 6/6438
219/703
(Continued)

FOREIGN PATENT DOCUMENTS

CN     1128336 A    8/1996
CN   102692040 A    9/2012
(Continued)

OTHER PUBLICATIONS

National Search Report CN 201880054590.2 dated Mar. 30, 2022.

*Primary Examiner* — Edward F Landrum
*Assistant Examiner* — Theodore J Evangelista
(74) *Attorney, Agent, or Firm* — Michael E. Tschupp; Andre Pallapies; Brandon G. Braun

(57) ABSTRACT

A microwave household appliance with at least one microwave source for generating microwaves, at least one microwave antenna for irradiating the microwaves in a treatment room and a control device for controlling the microwave household appliance based on quantized microwave parameters.

20 Claims, 1 Drawing Sheet

(51) Int. Cl.
*H05B 6/64* (2006.01)
*H05B 6/68* (2006.01)
*H05B 6/72* (2006.01)

(58) Field of Classification Search
CPC .. H05B 6/6458; H05B 6/6461; H05B 6/6464;
H05B 6/6467; H05B 6/66; H05B 6/68;
H05B 6/687; H05B 6/688; H05B 6/70;
H05B 6/705; H05B 6/72; H05B 6/725;
F24C 7/00; F24C 7/02; Y02B 40/00
See application file for complete search history.

(56) References Cited

U.S. PATENT DOCUMENTS

| | | |
|---|---|---|
| 9,265,097 B2 | 2/2016 | Torres et al. |
| 9,462,642 B2 | 10/2016 | Chu |
| 2012/0312801 A1* | 12/2012 | Bilchinsky ............... H05B 6/00 |
| | | 219/490 |
| 2013/0087545 A1 | 4/2013 | Bilchinsky et al. |
| 2014/0008357 A1* | 1/2014 | Cheng ..................... F24C 7/02 |
| | | 219/761 |

FOREIGN PATENT DOCUMENTS

| | | | | |
|---|---|---|---|---|
| CN | 106292553 A | 5/2015 | | |
| CN | 105067641 A | 11/2015 | | |
| CN | 105972651 A | 9/2016 | | |
| DE | 102012204234 A1 | 9/2013 | | |
| DE | 102014200355 A1 * | 7/2015 | ........... H05B 6/6411 |
| FR | 2571830 A1 | 4/1986 | | |

\* cited by examiner

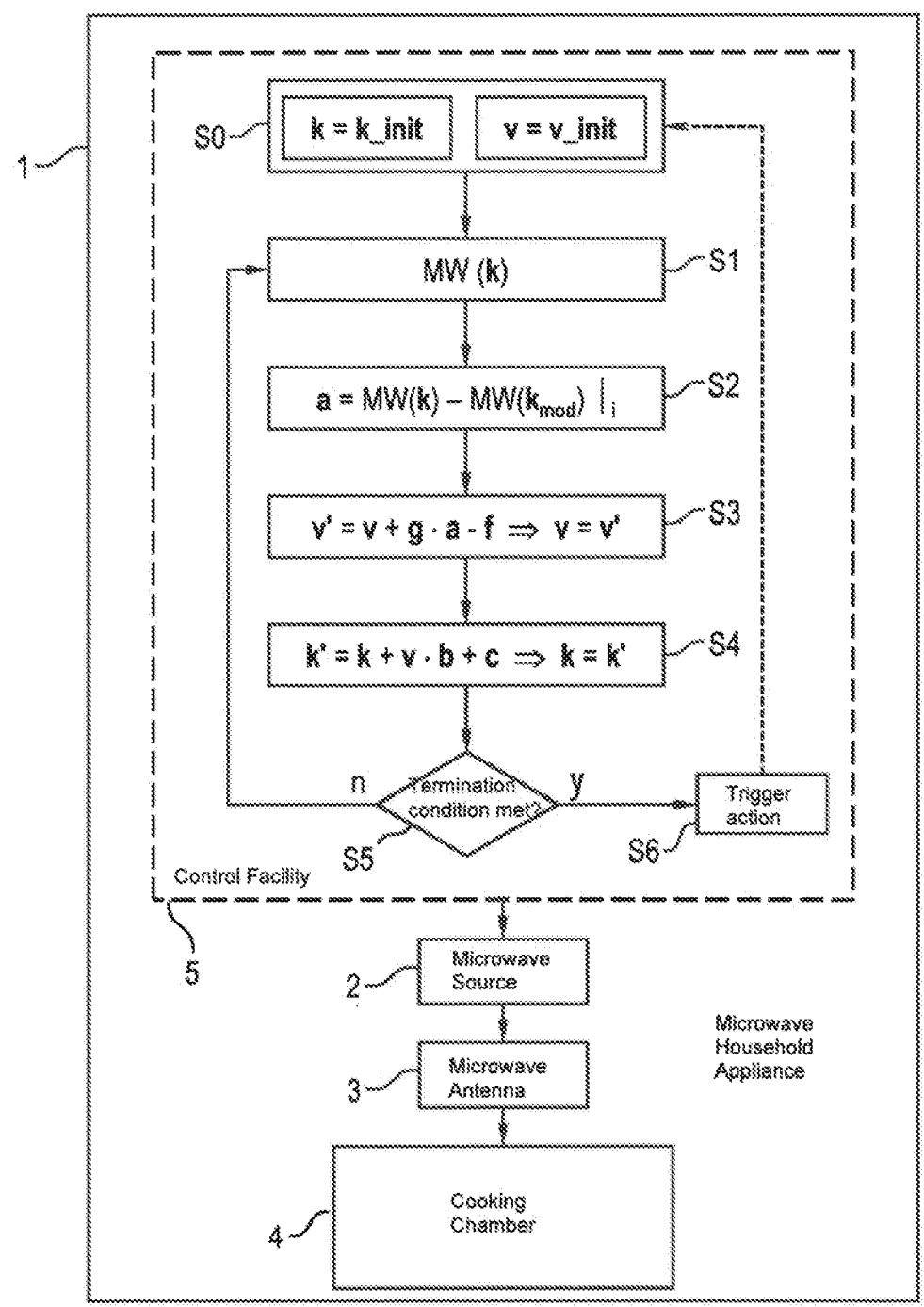

OPERATING A DOMESTIC MICROWAVE APPLIANCE

CROSS-REFERENCES TO RELATED APPLICATIONS

This application is the U.S. National Stage of International Application No. PCT/EP2018/069587, filed Jul. 19, 2018, which designated the United States and has been published as International Publication No. WO 2019/037963 A2 and which claims the priority of German Patent Application, Serial No. 10 2017 214 751.2, filed Aug. 23, 2017, pursuant to 35 U.S.C. 119(a)-(d).

BACKGROUND OF THE INVENTION

The heating of food using microwaves in a treatment chamber (also referred to as a cooking chamber) of a microwave cooking appliance should take place as evenly as possible and with a high level of efficiency. Any variation of microwave parameters such as frequency, amplitude and phase of the microwaves radiated in can bring about a change in the field distribution of the microwaves in the cooking chamber, which have the required properties when the microwave parameters are selected appropriately.

Variation of microwave parameters is known in principle. It is assumed that an ideal cooking operation brought about using microwave radiation can be determined by measuring and correlating the microwave power introduced into the cooking chamber by way of a microwave antenna system and the power radiated back to the antenna system by way of the cooking chamber. An absorption ratio AV is used for this purpose, being defined as follows for an antenna system with n antennas or channels:

$$i. AV = \frac{\sum_{1}^{n} P_{fwd}(n) - \sum_{1}^{n} P_{ref}(n)}{\sum_{1}^{n} P_{fwd}(n)}$$

$P_{fwd}(n)$ here refers to an introduced ("forward") microwave power and $P_{ref}(n)$ to a reflected microwave power of the respective channel. The reflected microwave power $P_{ref}(n)$ can be made up of the intrinsic reflection of said channel in the cooking chamber and a transfer of microwave power from other channels.

The absorption ratio AV is generally a function of the selection of an m-component parameter tuple or parameter vector k $$i.k = \begin{pmatrix} k_1(\alpha) \\ k_2(\beta) \\ \vdots \\ k_i(\iota) \\ \vdots \\ k_m(\omega) \end{pmatrix}$$

of m microwave parameters $k_i$ where i={1, ... m}, wherein the microwave parameters can comprise for example frequency, phase and/or amplitude and can be set as control parameters. Non-electrical variables, such as an (angular) position of a mode stirrer, can also be used as microwave parameters or vector components. All the microwave parameters $k_i$ are generally quantized and can in particular have a minimum value and/or a maximum value. Thus the first microwave parameter $k_1$ can correspond to a microwave frequency, which can assume for example values α from the value range [2400 MHz, 2401 MHz, ... ]. The value range therefore comprises values which have a step width of 1 MHz or are "quantized" with a step width of 1 Hz.

WO 2011/058538 A1 scans an m-dimensional parameter space and then supplies energy to the item being cooked with appropriate parameter vectors. WO 2011/058538 A1 also discloses an apparatus for applying electromagnetic energy to a load. The apparatus has at least one processor, which is configured such that it receives information, which corresponds to a dissipated energy for each of a plurality of modulation space elements and groups a plurality of modulation space elements in at least two subsets, based on the information obtained relating to the dissipated energy. The processor can also be configured such that it links a current supply protocol to each of the at least two subsets, the power transfer protocol differing between the two subsets and regulating the energy applied to the load in accordance with each power transfer protocol. Homogeneous heating is thus achieved with a low AV value in WO 2011058538 A1. A large part of the microwave power introduced is reflected back to the source and there are no hot spots in the item being cooked, which would result in only local heating. WO 2011058538 A1 checks a parameter space completely once and can then no longer monitor changes, as produced by cooking processes.

DE 10 2014 200 355 A1 relates to a method and apparatus for heating a medium using microwaves in a hollow space in a microwave appliance, which is substantially enclosed by metallically conductive walls, with the microwave parameters, such as frequency, amplitude and/or phase, and further parameters being varied to homogenize the field or avoid hot spots and a proportion of the absorbed power being determined for each parameter set, homogeneous heating of the medium to be heated being achieved, when power is emitted into the hollow space, preferably with parameter sets assigned to a low absorption ratio AV, the absorption ratio AV being formed from the ratio of the difference between power radiated in and received and the power radiated in. Provision is made here for the surroundings of an initial parameter vector to be searched for first with an optimization algorithm as a start solution, before continuing in the direction of the parameter vector resulting in the smallest absorption ratio in the surroundings investigated, the surroundings of this new parameter vector then being investigated and a step being taken again in the direction of the adjacent parameter vector resulting in a smaller absorption ratio AV. The method disclosed in DE 10 2014 200 355 A1 corresponds to a downhill simplex method. This procedure is performed iteratively until a minimum absorption ratio AV is found. At this point microwave power is introduced until the absorption ratio AV increases significantly. The procedure then starts again. Homogeneous heating with a low AV value is thus also achieved with DE 10 2014 200 355 A1. A large part of the introduced power is also reflected back to the source here and there are therefore no hot spots in the item being cooked, which would result in only local heating. DE 10 2014 200 355 A1 is also static and must find an appropriate parameter set or parameter vector before the cooking operation starts.

U.S. Pat. No. 9,265,097 B2 discloses a method for processing an object and comprises heating the object by applying radio frequency (RF) energy, monitoring a value that relates to an absorption rate of RF energy by the object during heating and adjusting the RF energy according to changes in a time derivative of the monitored value. A temporal derivative of the RF reflection is therefore observed here.

BRIEF SUMMARY OF THE INVENTION

It is the object of the present invention to at least partially overcome the disadvantages of the prior art and in particular to provide an improved option for heating food using microwaves. In particular it is one object to provide an option for heating food using microwaves, which can adjust to changes in the food to be heated. In particular it is a further object to provide an option for heating food using microwaves, which operates more rapidly, evenly and/or efficiently.

This object is achieved according to the features of the independent claims. Advantageous embodiments are set out in the dependent claims, the description and the drawings.

The object is achieved by a method for operating a microwave household appliance with at least one microwave source for generating microwaves, at least one microwave antenna for radiating the microwaves into a treatment chamber and a control facility for controlling the microwave household appliance based on m respectively quantized microwave parameters, wherein (a) microwaves are supplied to the treatment chamber according to a current parameter vector k and an associated microwave measurement value is determined, (b) a first vector a (referred to in the following without loss of generality as an "acceleration vector") is calculated component by component based on the difference between the microwave measurement value determined for the current parameter vector k and a microwave measurement value for a parameter vector, the respective component of which has been modified, (c) an m-component second vector v (referred to in the following without loss of generality as a "speed vector") is modified by adding the acceleration vector a to a current speed vector v and establishing the modified speed vector v' as the new current speed vector, a further parameter vector k' is determined by modifying the current parameter vector k using the new current speed vector v' and establishing the further parameter vector k' as the new current parameter vector and (e) steps (a) to (d) are repeated until at least one predefined termination condition is met. This method can also be referred to as "kinetic path searching".

The method has the advantage that a movement trajectory of the parameter vector leads specifically and particularly effectively to regions with at least locally extreme (minimum or maximum) microwave parameters and therefore results in homogeneous and, where appropriate, efficient heating of the food or item being cooked.

The method has the further advantage that it is dynamic and can respond in real time to rapid changes in the food produced by the cooking process, for example to food falling apart, melting away, changing its liquid content due to rapid evaporation or indicating a rapid change in its degree of reflection in another way. The microwave field introduced into the treatment chamber or cooking chamber adjusts to the changes, as the cooking operation continues. A relatively small subset of the parameter space or potential space spanned by the parameter vectors k is required to adjust the microwaves introduced. The next adjustment takes place based on a subsequent run through the steps (a) to (d) and is therefore always up to date.

The method is advantageously able to find operating points or parameter vectors, which correspond to particularly good reflection of the microwaves. The resulting avoidance of hot spots prevents local heating of the item being cooked.

The method is advantageously also able to find operating points or parameter vectors, which correspond to poor reflection of the microwaves. When reflection is poor, more power is transferred into the item being cooked. This can be used to heat food or items being cooked evenly, if the hot spots are evenly distributed in the food. It is particularly advantageous to pass through all possible operating points or parameter vectors with poor reflection or locally minimal reflection. This variant allows a particularly high level of efficiency and results in particularly low component strain as well as particularly low heat loss. In one development protection facilities (circulators) are not required in semiconductor systems, as there is no damaging feedback to the semiconductor at the operating points found with poor reflection or from regions around said points.

The method has the further advantage that it adjusts very rapidly to the food to be treated. The operating speed only drops linearly with the number m of control parameters $k_m$, while in WO 2011058538A1 the operating speed increases exponentially with the number m. The method according to DE 10 2014 200 355 A1 must also perform up to 3m-1 measurement operations per iteration for a complete scan of the surroundings of a point and is therefore also not really suitable for higher-dimensional regulating tasks, in other words regulation with a plurality of control parameters.

The microwave household appliance can be a free-standing microwave cooking appliance or a combination microwave appliance, e.g. an oven with microwave function.

The at least one microwave source can have at least one magnetron. The at least one microwave antenna can have one or more microwave antennas or channels. A number of microwave antennas can also be referred to as an antenna system. The at least one microwave source and the at least one microwave antenna together can also be referred to as a microwave system.

When the microwave household appliance is embodied as a microwave cooking appliance the treatment chamber can also be referred to as the cooking chamber.

That the control facility can set or control the feeding of the microwaves into the treatment chamber based on m (m>=1) microwave parameters corresponds to the use of m different microwave parameters. That the microwave parameters are quantized means in particular that the respective values the microwave parameter can assume can each be set in steps. Thus the microwave frequency can have for example the values [902 MHz, 903 MHz, . . . , 928 MHz] and/or [2400 MHz, 2401 MHz, . . . , 2500 MHz]. The m microwave parameters correspond to vector components of the parameter vector k.

The acceleration vector a is an m-component vector $$a = \begin{pmatrix} a_1 \\ a_2 \\ \vdots \\ a_m \end{pmatrix},$$

the vector components $a_i$ of which are calculated based on the difference between the microwave measurement value MW (k) determined for the current parameter vector k and a microwave measurement value MW ($k_{mod}$) for a parameter vector $k_{mod}$ modified component by component, the respective component $k_i$ of which has been modified. The component $a_i$ can therefore be modified according to $a_i = MW(k) - MW(k_{mod})$ with $$i. k_{mod} = \begin{pmatrix} k_1(\alpha) \\ k_2(\beta) \\ \vdots \\ k_i(\iota + j) \\ \vdots \\ k_m(\omega) \end{pmatrix}$$

where only the associated ith component is modified so that it points to a different value from the one for the parameter vector k. This can be performed for all i values. The microwave measurement values can be measured by means of the microwave household appliance in the manner known in principle, for example by means of a directional coupler.

The m-component speed vector modified in step (c)

$$v' = \begin{pmatrix} v'_1 \\ v'_2 \\ \vdots \\ v'_m \end{pmatrix},$$

can therefore be calculated according to $$v' = v + g \cdot a$$

where g is generally a constant vector $$g = \begin{pmatrix} g_1 \\ g_2 \\ \vdots \\ g_m \end{pmatrix}$$

with predefined constants $g_i$. The product here is defined such that $g \cdot a$ itself is again a vector with the components $g_1 \cdot a_1$, $g_2 \cdot a_2$, etc. g can alternatively be written as a diagonally populated matrix. The value difference of the microwave measurement value MW of a microwave parameter determines—as a function of the selection of g—the direction and value with which the parameter vector k is accelerated.

In step (d) it is established as a function of the respective speed component $v_i$ whether and in which direction and, where applicable, by how much the microwave parameters $k_i$ have changed.

When a termination condition has been met, at least one action can be triggered.

Steps (a) to (d) do not necessarily have to be performed in this sequence. For example step (c) can also be performed before step (b). The method generally results in a parameter vector or operating point, which corresponds in particular to a local extreme (minimum or maximum) of the microwave measurement value in the parameter space. The parameter vector can stop at this extreme parameter vector or operating point or pass through it.

In one embodiment the microwave measurement value is a degree of reflection RG of the microwave radiation. The degree of reflection RG can be defined as $$i. RG(k) = \frac{\sum_{1}^{n} P_{ref}(n)}{\sum_{1}^{n} P_{fwd}(n)}.$$

Alternatively or additionally the absorption ratio $$i. AV(k) = \frac{\sum_{1}^{n} P_{fwd}(n) - \sum_{1}^{n} P_{ref}(n)}{\sum_{1}^{n} P_{fwd}(n)}$$

can be used.

In a further embodiment in step (b) the respective component $k_i$ ($\iota+j$) of the parameter vector $k_{mod}$ modified component by component is modified by changing a value of said component by a predefined step width j. The step width j can in principle be defined arbitrarily. In one particularly advantageous development the control parameter $k_i$ ($\iota$) is displaced in a positive direction of the grid or step sequence, in other words is displaced from the quantization or grid position $\iota$ to the grid position $\iota+j$ where $j>0$, if $v_i$ has a positive value. If $v_i$ has a negative value, in one development $\iota-j$ where $j>0$ is selected as the next grid position. The change j is advantageously 1, in other words an adjacent value is used.

In a further embodiment in step (c) the speed vector v is modified by adding a product of the current acceleration vector a and a predefined scalar acceleration constant g to the current speed vector v. The following then applies for the modified speed vector v'

$$v' = v + g \cdot a,$$

where g is now an identical constant number for all the components $a_i$. The product $g \cdot a$ is a vector with the components $g \cdot a_1$, $g \cdot a_2$, etc. This embodiment is particularly simple to use.

By selecting—where appropriate component by component—the sign before the constant vector g or by selecting the sign before the scalar acceleration g it is possible to establish whether the parameter vector moves in the direction of a local minimum or a local maximum. If g is positive, the parameter vector k moves for example in the direction of a minimum; if g is negative, it moves in the direction of a maximum.

In a further embodiment in step (d) the current parameter vector k is modified by modifying its components $k_i$ using the associated components $v_i$ of the current speed vector v. In particular the current parameter vector k can be modified by modifying, displacing or moving the values of its components $k_i$ from the current position $k_i$ ($\iota$) according to $$k_i' = k_i(\iota+j) \text{ if } v_i > 0 \text{ and } k_i' = k_i(\iota-j) \text{ if } v_i < 0.$$

This movement is performed for all $i = [1, \ldots, m]$ components. This embodiment can be realized particularly easily.

In a further embodiment step (d) is only performed if a magnitude of the speed vector v reaches or exceeds a predefined threshold value. This facilitates finding an extreme value of the microwave measurement value, as small differences in the microwave measurement value no longer influence the parameter vector. This can also be performed component by component, in other words step (d) is only performed for a component $k_i$, if a magnitude $|v_i|$ of the corresponding component $v_i$ of the speed vector v reaches or exceeds a predefined threshold value.

It is particularly advantageous, if $j=1$.

In a further development the step width j to a new position is $k_i$ ($\iota \pm j$) is relative to $v_i$, in other words $j = f(v_i)$. This condition can be applied component by component and/or to the entire parameter vector. In a further development $j \sim 1/v_i$. This can have the advantage that regions of the parameter space with poor reflection are passed through slowly, while regions with good reflection are bypassed rapidly, as v or $v_i$ is typically greater in regions with poor reflection and smaller in regions with good reflection, if the proportionality factor g is positive and therefore regions with poor reflection are to be triggered by preference. If g<0 is selected, regions of the parameter space with good reflection are passed through slowly, while regions with poor reflection are bypassed rapidly.

In a further embodiment in step (c) the speed vector is modified by also subtracting a factor ("friction factor") f counter to a direction of the speed vector. This can also be written as $$v'=v+g \cdot a-f.$$

The friction factor f causes the magnitude of the components of the speed vector v to be reduced and therefore the virtual speed of the parameter vector in the parameter space to be reduced at least component by component. The friction factor f can be identical for all components or can differ by component. That the friction factor f is subtracted counter to the direction of the speed vector can mean that $$v_i'=v_i-f \text{ if } v_i>0 \text{ and}$$

$$v_i'=v_i+f \text{ if } v_i<0$$

for f>0. This embodiment has the advantage that additional regions in the parameter space with optimized microwave parameters $k_i$ can be found, as the movement trajectory of the parameter vector k is also disrupted by the friction factor f and extended by a randomized movement variable.

In another embodiment in step (c) the speed vector v is modified by amplifying it at time intervals. This has the advantage that speed lost due to the friction factor f can be returned to the speed component $v_i$.

The search intensity of the method can be increased significantly by appropriate selection of the values for g and/or f, as f and the regular amplification of v provide the movement of the parameter vector k with a chaotic or practically chaotic variable, which significantly increases the statistical search intensity and avoids repetition or redundancy when passing through in the parameter space.

Amplification can be implemented for example so that when a component $v_i$ is reduced by j=1 per iteration or run through the steps (a) to (e), all p iterations (e.g. where p=10) of every $v_i$ are increased again by the number of previous reductions (e.g. as long as $|v_i|>>0$). This can be performed in the same way for increases of L or combinations of increases and reductions, as well as for values j>1 etc.

In another development in step (c) the speed vector v is modified by resetting it to a standard value at time intervals, it being possible to maintain the direction information of the individual components $v_i$ in the process. Maintaining the direction information is the same as keeping the same sign before $v_i$. This has the advantage that its performance requires particularly little computation outlay.

In one embodiment the time intervals are regular intervals. It is particularly advantageous if the component by component amplification is provided with a component by component random distribution. This development has the advantage that movement of the parameter vector in the parameter space becomes "more chaotic", as this development results in a "wriggle" and prevents adherence to defined trajectories in the parameter space, for example an unrestricted fluctuation to and fro in a narrow potential sink, which can result in practice in the maintenance of hot spots and therefore combustion in the item being cooked. This development can be implemented for example in such a manner that all q iterations (where for example q=10) of two speed components $v_i$ are not displaced by j=10 units each but for example by j=15 or 5 units.

In another embodiment in step (d), if an edge of a value range is reached for a component $k_i$, a sign before the associated speed component $v_i$ is reversed. This corresponds to a movement reversal of the speed component $v_i$ at the edge.

In a further embodiment at the start of the method an initial parameter vector and an initial speed vector are predefined as current vectors. In one development the initial parameter vector and/or the initial speed vector are selected randomly. In a further development the initial parameter vector and/or the initial speed vector are selected based on historic data, for example based on a vector of a previously performed method sequence or a position in the parameter space, the surroundings of which have not yet been passed through.

In step (e) at least one action can be triggered when at least one termination condition is met.

In a further embodiment in step (e) when at least one termination condition is met, the method is performed again with a different initial parameter vector and/or with a different initial speed vector. This has the advantage that a particularly large part of the parameter space can be searched for suitable parameter vector positions. With this embodiment therefore an extreme (minimum or maximum) operating point is not approached and left there but the parameter vector passes through the parameter space unceasingly. In particular—due to the nature of the method—extreme operating points are passed through automatically in the process. This is in particular a statistical, dynamic process, which does not require historical data. This embodiment is particularly advantageous if a lot of homogeneously distributed, dynamically changing hot spots are to be generated. This embodiment is based on the surprising knowledge that the parameter vector k is typically located much more frequently in a local region that encloses a maximum or minimum to be reached and also produces high or low values of the microwave measurement value. Regions with (low or high) values counter to the nature of the extreme are passed through rapidly in contrast.

In another embodiment in step (e) when at least one termination condition is met, there is switching between a search for minima and a search for maxima of the microwave value. This can be performed with or without any change to the initial parameter vector and/or the initial speed vector. Switching between the search for minima and the search for maxima can be a function of a set or activated cooking program.

In a further embodiment in step (e) when at least one termination condition is met, the current parameter vector is maintained. This means that a stable operating point is maintained, for example until the end of the cooking sequence. This can be particularly advantageous for short treatment times.

In a further embodiment the at least one termination condition means that the parameter vector is not modified for a predefined number of loops of steps (a) to (e) passed through.

In a further embodiment the at least one termination condition means that the microwave measurement value no longer changes significantly for a predefined number of loops of steps (a) to (e) passed through.

In a further embodiment the at least one termination condition means that information from at least one dedicated sensor meets a predefined condition. Thus infrared sensors can monitor the item being cooked and set the value for g to a negative number (corresponding to search for points with max. reflection) when a hot spot is established, to distribute the temperatures more evenly.

In a further embodiment the at least one termination condition means that the method is terminated, for example by terminating the associated cooking operation. This can result for example from reaching a preset cooking time, terminating a cooking program, reaching a predefined cooked item temperature, etc.

However the termination conditions are not restricted to these.

The object is also achieved by a microwave household appliance with at least one microwave source, at least one microwave antenna for radiating microwaves into a treatment chamber and a control facility for controlling the microwave household appliance based on m quantized microwave parameters, the control facility being set up by performing the method as claimed in one of the preceding claims. The microwave household appliance can be configured in the same way as the method and has the same advantages.

The microwave household appliance is advantageously a microwave cooking appliance, e.g. a free-standing microwave cooking appliance or a combination microwave appliance, e.g. an oven with microwave function.

BRIEF DESCRIPTION OF THE DRAWINGS

The properties, features and advantages of the present invention described above as well as the manner in which these are achieved will become clearer and more readily understandable in conjunction with the following schematic description of an exemplary embodiment, which is described in more detail with reference to FIG. 1.

FIG. 1 shows a diagram of a microwave household appliance in the form of a microwave cooking appliance 1 with at least one microwave source 2 for generating microwaves, at least one microwave antenna 3 for radiating microwaves into a cooking chamber 4 and a control facility 5 for controlling the microwave cooking appliance 1 based on a number of quantized microwave parameters. The control facility 5 is designed (e.g. programmed) to allow the running of a method S0-S6 for operating a microwave household appliance 1.

DETAILED DESCRIPTION OF EXEMPLARY EMBODIMENTS OF THE PRESENT INVENTION

With the method S0-S6 in a step S0 an initial m-dimensional parameter vector k_init and an initial -dimensional speed vector v_init are first established as the current parameter vector k and current speed vector v.

In a step S1 microwaves are then supplied to the treatment chamber 4 according to the current parameter vector k and an associated microwave measurement value MW (k) is measured, in particular in the form of a degree of reflection.

In a following step S2 an acceleration vector a is calculated component by component based on the difference between the microwave measurement value MW (k) determined for the current parameter vector k and a microwave measurement value MW ($k_{mod}$) in the form of a degree of reflection for a parameter vector $k_{mod}$, the respective component $a_i$ of which has been modified.

Then in a step S3 the speed vector v is modified by adding the acceleration vector a to a current speed vector v and establishing a speed vector v' thus modified as the new current speed vector v. In particular a product of the current acceleration vector a and a predefined acceleration constant g can be added to the current speed vector v. A friction factor f can be subtracted from the current speed vector v, where appropriate component by component. The speed vector v can also be modified by amplifying it at time intervals.

In a following step S4 a further parameter vector k' is determined by modifying the current parameter vector k using the new current speed vector v. In embodiments, the new current speed vector v is multiplied by a factor b. In embodiments, a factor c is added as a part of vector k'. The further parameter vector k' is then established as the new current parameter vector k. This modification can be performed component by component and can in particular be linked to a magnitude of the speed vector or a respective component of the speed vector reaching or exceeding a predefined threshold value. If an edge of a value range is reached for a component of the parameter vector k, a sign before the associated speed component can be reversed.

Then in a step S5 it is checked whether a predefined termination condition is met. If not ("n"), the method returns to step S1. The termination condition can mean that the parameter vector is not modified for a predefined number of loops of steps S1 to S4 passed through. Alternatively or additionally a termination condition can mean that the microwave measurement value MW no longer changes significantly for a predefined number of loops of steps S1 to S4 passed through.

If so ("y"), in step S6 at least one action is triggered. This action can comprise branching to step S0 and selection of a different initial parameter vector k_init and selection of a different speed vector v_init. Alternatively the last found parameter vector k can be kept constant for the remaining period of the treatment sequence.

The present invention is of course not restricted to the illustrated exemplary embodiment.

Generally "one", etc. can refer to one or a number, in particular in the sense of "at least one" or "one or more", etc., unless this is specifically excluded, for example by the expression "just one", etc.

A number can also refer to just the cited number as well as a standard tolerance range, unless this is specifically excluded.

The invention claimed is:

1. A method for operating a microwave household appliance with at least one microwave source for generating microwaves, at least one microwave antenna for radiating the microwaves into a treatment chamber and a control facility for controlling the microwave household appliance, said method comprising:
   (a) supplying microwaves to the treatment chamber according to a current parameter vector having quantized microwave parameters, and determining an associated microwave measurement value;
   (b) computing, component-by-component, an acceleration vector based on a difference between the microwave measurement value determined for the current parameter vector and a microwave measurement value for a parameter vector having respective modified components;
   (c) generating a new current speed vector by adding the acceleration vector to a current speed vector;

(d) generating a new current parameter vector by modifying the current parameter vector using the new current speed vector;

(e) repeating steps (a) through (d) until at least one predefined terminating condition is met; and (f) termination operation of the microwave household appliance after the predetermined termination condition is met.

2. The method of claim 1, wherein the microwave measurement value is a degree of reflection.

3. The method of claim 1, wherein in step (b) a respective component of the parameter vector modified component is modified by changing a value of the respective component by a predefined step width.

4. The method of claim 1, wherein in step (c) the current speed vector is modified by multiplying the acceleration vector with a predefined acceleration constant before addition to the current speed vector.

5. The method of claim 1, wherein in step (d) the current parameter vector is modified by modifying its components using associated components of the current speed vector.

6. The method of claim 1, wherein step (d) is performed only when a magnitude of the current speed vector or a magnitude of at least one component of the current speed vector reaches or exceeds a predefined threshold value.

7. The method of claim 6, wherein in step (d) a mathematical sign before the at least one component of the current speed vector is reversed when a component of the current parameter vector reaches a boundary of a value range.

8. The method of claim 1, wherein in step (c) the speed vector is modified by subtracting a friction factor in a direction opposing a direction of the current speed vector.

9. The method of claim 8, wherein in step (c) the current speed vector is modified by amplifying the speed vector at predetermined time intervals.

10. The method of claim 1, wherein an initial parameter vector and an initial speed vector are defined prior to executing the method.

11. The method of claim 10, wherein when the at least one predefined termination condition is met in step (e), the method returns to step (a) with a different initial parameter vector and/or a different initial speed vector.

12. The method of claim 1, wherein when the at least one predefined termination condition is met in step (e), the current parameter vector is maintained.

13. The method of claim 1, wherein the at least one termination condition is met in step (e), when the current parameter vector is not modified for a predefined number of repeated steps (a) through (e).

14. The method of claim 1, wherein the at least one termination condition is met in step (e), when the microwave measurement value does not change significantly for a predefined number of repeated steps (a) through (e).

15. A microwave household appliance comprising:
at least one microwave source for generating microwaves;
at least one microwave antenna for radiating the microwaves into a treatment chamber; and
a control facility for controlling the microwave household appliance, the control facility configured to (a) supply microwaves to the treatment chamber according to a current parameter vector having quantized microwave parameters, and determining an associated microwave measurement value, (b) compute, component-by-component, an acceleration vector based on a difference between the microwave measurement value determined for the current parameter vector and a microwave measurement value for a parameter vector having respective modified components;

(c) generate a new current speed vector by adding the acceleration vector to a current speed vector;

(d) generate a new current parameter vector by modifying the current parameter vector using the new current speed vector;

(e) repeat steps (a) through (d) until at least one predefined termination condition is met; and (f) terminate operation of the microwave household appliance after the predetermined termination condition is met.

16. The microwave household appliance of claim 15, wherein the microwave measurement value is a degree of reflection.

17. The microwave household appliance of claim 15, wherein in step (b) a respective component of the parameter vector modified component is modified by changing a value of the respective component by a predefined step width.

18. The microwave household appliance of claim 15, wherein in step (c) the current speed vector is modified by multiplying the acceleration vector with a predefined acceleration constant before addition to the current speed vector.

19. The microwave household appliance of claim 15, wherein in step (d) the current parameter vector is modified by modifying its components using associated components of the current speed vector.

20. The microwave household appliance of claim 15, wherein the at least one termination condition is met in step (e), when the current parameter vector is not modified for a predefined number of repeated steps (a) through (e).

* * * * *